(12) United States Patent
Limont et al.

(10) Patent No.: US 7,516,478 B2
(45) Date of Patent: Apr. 7, 2009

(54) REMOTE MANAGEMENT OF MOBILE DEVICES

(75) Inventors: David Paul Limont, Seattle, WA (US); Omar A. Aftab, Redmond, WA (US); Patrick Tousignant, Bellevue, WA (US); Zhidong Yang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 440 days.

(21) Appl. No.: 11/145,282

(22) Filed: Jun. 3, 2005

(65) Prior Publication Data

US 2006/0277590 A1 Dec. 7, 2006

(51) Int. Cl.
*G06F 21/00* (2006.01)
(52) U.S. Cl. .......................................... 726/1; 713/168
(58) Field of Classification Search ................ 726/1–3, 726/16, 11, 29, 35; 713/168, 182–183; 380/258
See application file for complete search history.

(56) References Cited

U.S. PATENT DOCUMENTS

| | | | |
|---|---|---|---|
| 5,613,206 A * | 3/1997 | Bantz et al. .................. 455/450 |
| 7,024,491 B1 * | 4/2006 | Hanmann et al. ............ 709/248 |
| 2003/0008662 A1 * | 1/2003 | Stern et al. ................... 455/456 |
| 2006/0021059 A1 * | 1/2006 | Brwon et al. .................. 726/26 |
| 2006/0075216 A1 * | 4/2006 | Vaha-Sipila et al. ............ 713/2 |
| 2006/0224742 A1 * | 10/2006 | Shahbazi ..................... 709/226 |
| 2007/0143824 A1 * | 6/2007 | Shahbazi ........................ 726/1 |
| 2007/0186275 A1 * | 8/2007 | Shahbazi ........................ 726/2 |

* cited by examiner

*Primary Examiner*—Gilberto Barron, Jr.
*Assistant Examiner*—Shahrouz Yousefi
(74) *Attorney, Agent, or Firm*—Amin, Turocy & Calvin, LLP (57) ABSTRACT

Systems and methodologies that proactively push down and enforce policies of a server(s) on mobile devices, when such devices connect to the server(s) for data synchronization. The subject invention employs a policy delivery and enforcement logic that is integrated as part of a communication channel (e.g. a single communication channel) with the mobile device (s). A hand shake can take place between the mobile devices and the server every time that a new policy occurs. Accordingly, non-compliant devices are denied service from the server.

20 Claims, 11 Drawing Sheets

REMOTE MANAGEMENT OF MOBILE DEVICES

BACKGROUND

Increasing advances in computer technology (e.g., microprocessor speed, memory capacity, data transfer bandwidth, software functionality, and the like) have generally contributed to enhanced computer application in various industries. For example, mobile electronic organizer devices are being widely used to manage and classify a variety of data. A mobile electronic organizer typically enables a user to electronically retain personal data for any purpose and to retrieve the data as desired. Today, even though Personal Information Managers (PIMs) vary widely with respect to appearances, yet common to all of such devices is the ability to provide methods for managing and organizing personal information and to readily supply the information to the user.

Moreover, in accordance with a common PIM, a user can search contact entries alphabetically by name, by keyword, and appointments by date, topic, and the like. Essentially, once personal data is entered into a PIM, the user can query data and retrieve information according to a plurality of specified criteria.

Nonetheless, lack of ability for associated servers to remotely define policies and enforce those policies can create problems when employing such devices. For example, a user of a mobile device may lose the device that contains confidential information thereon. If such user has not pin locked the mobile device, the confidential information can be accessed by an unauthorized user. Likewise, often new policies are promulgated by an administrator that need to be quickly enforced by the mobile devices, yet users may procrastinate in doing so.

At the same time, employees of corporations using mobile devices for performance of day-to-day activities may accidentally or intentionally change setting on their devices in violation of agreed rules and procedures of their employer company. For example, a user may install potentially malicious applications that compromise corporate data in violation of corporate policy.

Currently, formal device management solutions require dedicated hardware and can become expensive. For example, such solutions can typically require servers to exclusively handle device management functionality, and/or have separate and additional channels of communication with the mobile device. This can create inefficiencies and increase costs.

Therefore, there is a need to overcome the aforementioned exemplary deficiencies associated with conventional systems and devices.

SUMMARY OF THE INVENTION

The following presents a simplified summary of the invention in order to provide a basic understanding of one or more aspects of the invention. This summary is not an extensive overview of the invention. It is intended to neither identify key or critical elements of the invention, nor to delineate the scope of the subject invention. Rather, the sole purpose of this summary is to present some concepts of the invention in a simplified form as a prelude to the more detailed description that is presented hereinafter.

The subject invention provides for systems and methods of proactively pushing down and enforcing policies on a mobile device(s) from a server, via employing a policy delivery and enforcement logic that is integrated as part of a communication channel (e.g. a single communication channel) with the mobile device(s). A hand shake can take place between the mobile device(s) and the server every time that a new policy occurs, or any time a synchronization is requested therebetween. Such policy delivery and enforcement logic can verify proper installation of server policies in a timely manner, and non-compliant devices are denied service from the server.

In a related aspect of the subject invention, upon a request for synchronization by the mobile device/client the server identifies the policy key and upon detecting an invalid and/or expired policy, the server returns an error message to the mobile device/client. Subsequently, and in response to such error message, the client returns a Provision command. Such Provision command can specify a current version of the policy employed by the mobile device and a content type that it understands for the policy setting. The server can then send down all settings (e.g., at once) to the client. Next, the client can send an acknowledgement that indicates that all policies required by the server have been implemented, and at that point the server can permit synchronization to occur. Such policy delivery and enforcement logic typically supplies flexibility to the server (e.g., to impose arbitrary policies on the mobile device), and provides for an extensible provisioning mechanism.

According to a further aspect, the policy delivery and enforcement logic of the subject invention, can verify the settings every time the client (e.g., mobile devices) requires synchronization with the server. Such settings can include a length of the password, designation for possible combinations of words and letters employed in the password. Moreover, additional features (e.g., number of days e-mails can be stored, disabling/enabling certain functionalities, plugins and general expandable mechanisms for configuring the mobile devices and the like), can be designated typically without a need to re-engineer the entire server, as the policy enforcement logic does not derive from the server settings. As such, an expandable XML document can be employed that can configure a plurality of features for the client/mobile devices, wherein the configurations can be sent to the clients from the server, to remotely manage the clients.

In a further aspect of the subject invention, the mobile devices that request synchronization with the server are prompted to accept new policies set by the server in order to synchronize therewith. Upon acceptance of such policies, the server immediately supplies the updated policies, and synchronization can commence upon such policies implemented by the mobile devices. Thus, a proactive configuration and enforcement can be supplied from the server that facilitates operation of a network administrator.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION OF THE INVENTION

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," and the like are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal).

Figure 1:
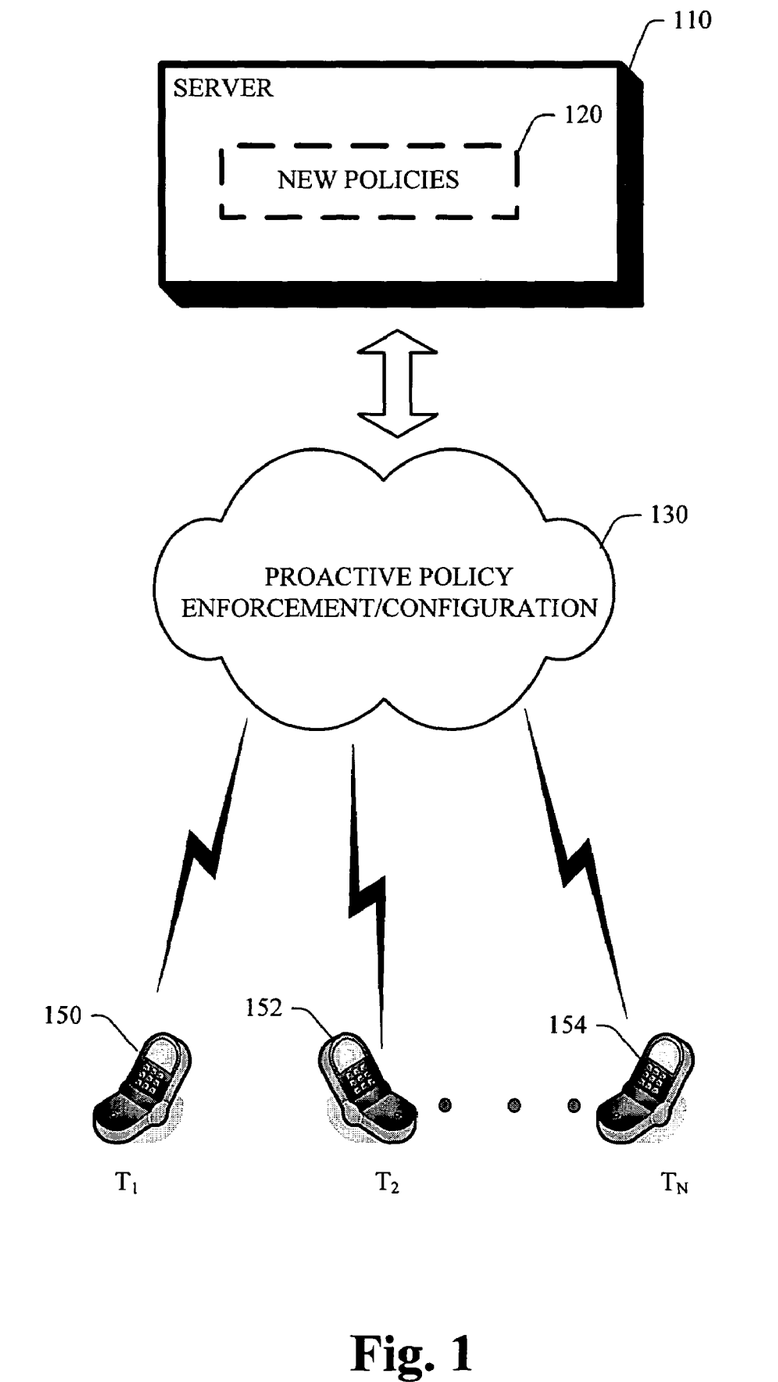
FIG. 1 illustrates a schematic diagram of a policy delivery and enforcement logic in accordance with an aspect of the subject invention.

The subject invention provides for systems and methods of proactively pushing down and enforcing policies for mobile devices, (e.g., when such devices connect to a server for data synchronization), via employing a policy delivery and enforcement logic that is integrated as part of communication channel with the mobile devices. Accordingly, non-compliant devices are denied service from the server. Referring initially to FIG. 1, there is illustrated a schematic diagram of proactive policy enforcement and/or configuration model 130 that enforces the new policies 120, of the server 110 on to a plurality of mobile units 150, 152, and 154 ($T_1$ to $T_N$, N being an integer). The proactive policy enforcement/configuration model 130 of the subject invention can set a plurality of features such as: policy compliance, force PIN lock, set PIN lock minimum length, specify PIN alphanumeric or numeric, force local wipe of device after predetermined number of attempts to unlock with PIN, force local wipe of device on next connect to the server 110, specify a pass code that a user must enter after predetermined PIN unlock failures, prevent end users form installing custom applications.

Accordingly, the subject invention can mitigate or eliminate problems related to: lost mobile devices, uncooperative users that delay compliance with new or updated protocols set by an administrator, altering settings on mobile devices that violate company policy, selective applications of various policies to different users, periodic check for policy compliance, subversion of policy settings by a user, restoration of the policies, roll back of policy settings for exempt devices, and the like. The proactive policy enforcement configuration model 130 employs Provision commands that can negotiate policy settings between the mobile devices 150, 152, 154 and the server 110.

Figure 2:
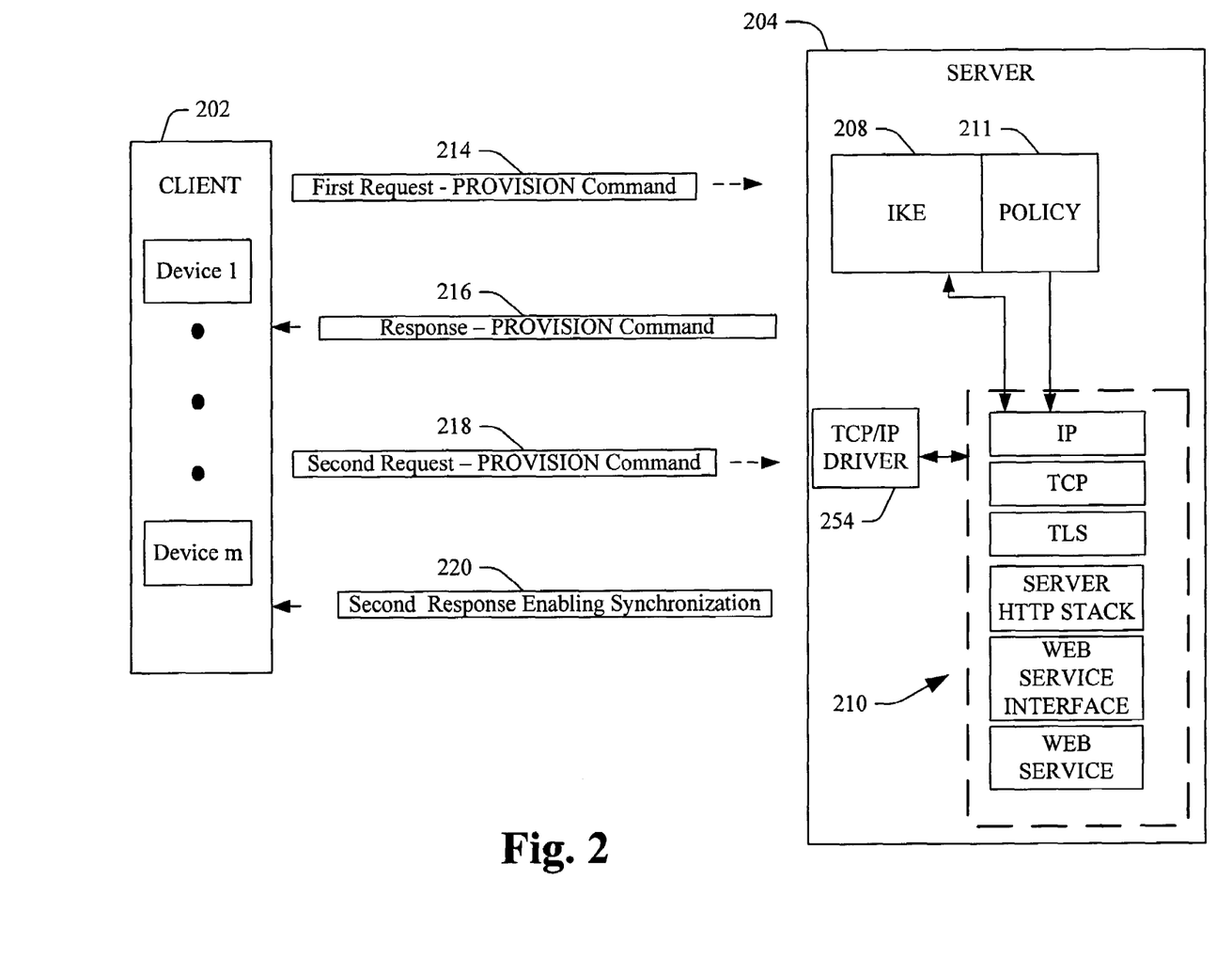
FIG. 2 illustrates a block diagram of a client server interaction for a remote policy setting in accordance with an aspect of the subject invention.

Referring now to FIG. 2, there is illustrated a block diagram of a client-server interaction in accordance with an aspect of the subject invention. A hand shake can take place between the client 202 (e.g., mobile devices 1 to m, where m is an integer) and the server 204 every time that a new policy is implemented by an administrator. As illustrated in FIG. 2, a sequence of query acts between client machine 202 (e.g., mobile devices) and the server 204, which sets and configures client machine 202 according to new policies/settings. The communication itself can be done via a secure channel. The server 204 can include a service side secure network stack 210 that further includes an IP layer implementation, a service side TCP layer implementation, a service side TLS, an HTTP stack implementation, a web service provider interface and a web service. The server 204 can include an Internet Key Exchange (IKE) subsystem 208 for securing network traffic between the server 204 and the client devices 202. The server 204 can also include policy modules 211 to enable configuration of the IKE subsystems 208. The policy module 211 can also provide security configuration information to the secure network stack 210, which communicate via TCP/IP driver 254, thereby enabling secure network traffic between the server 204 and the client machines 202.

The server 204 can determine if the client machine 202 needs to be provisioned with new policy information. For example, the policy delivery and enforcement logic of the subject invention, can verify the settings every time the client machines 202 (e.g., mobile devices) requires a synchronization with the server 204. As explained earlier, such settings can include a length of the password, possible combinations for words and letters employed in the password, and designation of additional features such as: number of days e-mails can be stored, disabling/enabling certain functionalities, plugins and general expandable mechanisms for configuring the mobile devices and the like. Such features can be designated typically without a need to re-engineer the entire server 204, as the policy enforcement logic does not derive from the server settings.

The server 204 can configure and set new policy configurations via standardized set of messages. For example, at 214 a first request in form of a Provision command for content type, as described in detail infra, can be sent from the client machine 202 to the server 204. Typically such Provision command can negotiate policy settings between the client machine 202 and the server 204. Next, and at 216 a first response in form of a further Provision command identifying the policy key, content type, settings and the like can be sent from the server 204 to the client machine 202. Subsequently and at 218, a second request in form of a Provision command that identifies policy key and status is sent from the client machine 202 to the Server 204. A second response can then be prepared and sent back to the client machine at 202 regarding the policy key and status for configuring/setting the client machine 202, and permit a synchronization with the server 204. The received responses from the server 204 can also be displayed to a user during various stages of interacting with the server 204, via a dialog box presentation, as described in detail infra. Next, the user can proceed with a synchronization of mobile device 202 with the server 204.

An exemplary schema that can define an expression of shared vocabulary between the client machine 202 and the server 204 is presented in detail infra. Such exemplary schema can for example be in form of an Extensible Markup Language (XML) that can define and describe a class of XML documents using schema constructs of an XML schema language. These schema constructs can be used to constrain and document the meaning, usage, and relationships of data types, elements and their content, attributes and their values, entities, contents and notations, as used in XML documents. Thus, in general any computer system that can access an XML schema can process XML documents in accordance with the XML schema. Furthermore, typically any computer system that can access an XML schema can compose or modify XML documents for use by other computer systems that can also access the XML schema. A schema can be utilized to define virtually any data type including logical, binary, octal, decimal, hexadecimal, integer, floating-point, character, character string, user-defined data types, and combinations of these data types used to defined data structures. XML elements and attributes can be defined to represent data types that are defined by a schema.

Figure 3:
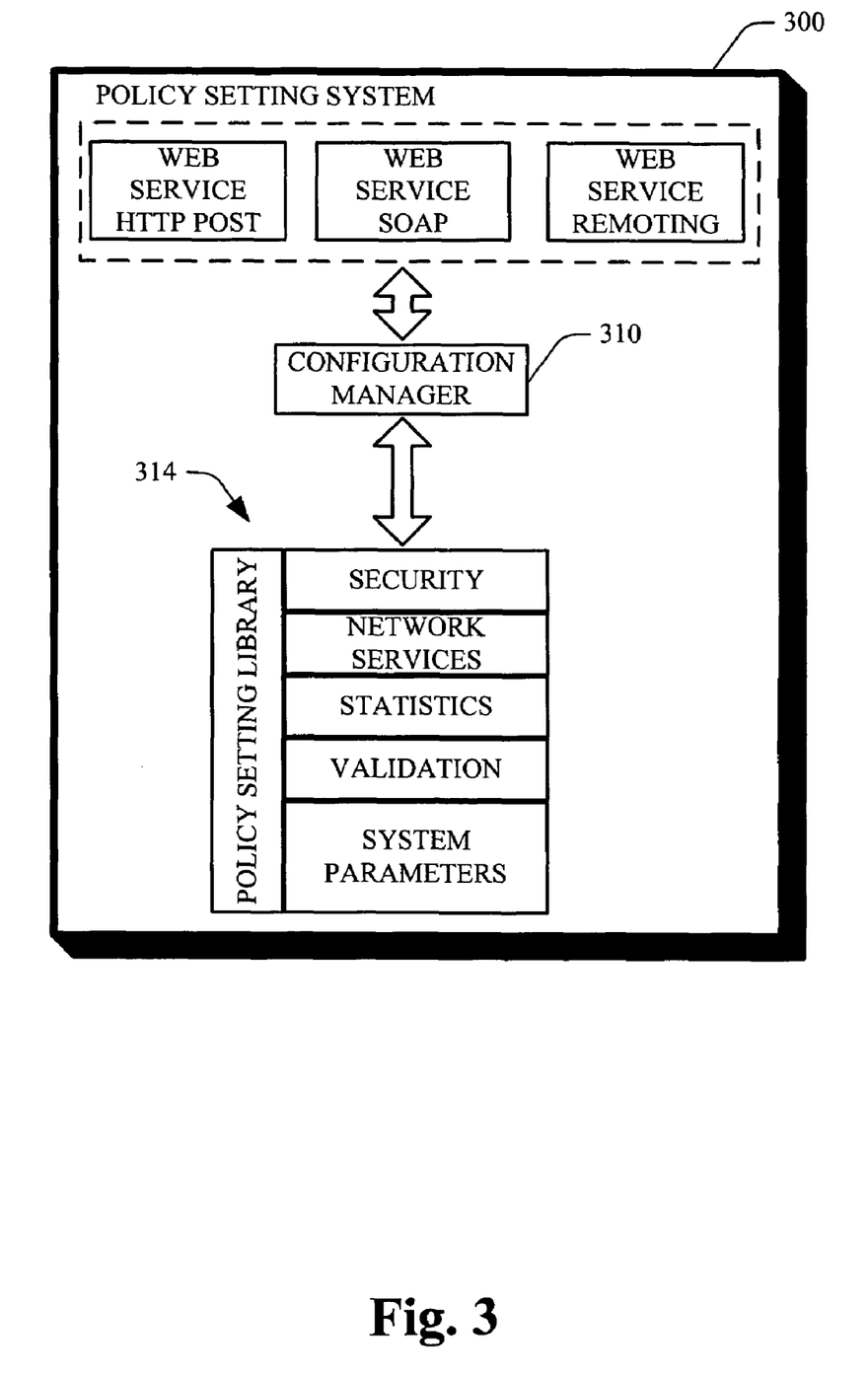
FIG. 3 illustrates a block diagram of a policy setting system associated with a server in accordance with an aspect of the subject invention.

FIG. 3 illustrates a block diagram of a policy setting system 300 associated with a server (not shown) in accordance with an aspect of the subject invention. The policy setting system 300 can include a configuration manager 310 that can interact with a policy setting library 314, to set new policy configurations and track an authorization, security, validation and to verify connection of a client thereto. A load threshold can also be provided by the configuration manager 310, to determine whether to commence, pause, resume and/or halt data transfer on any machine that request synchronization with an associated server (not shown), for example, to balance processing across the server. Typically, when a message transfer session (e.g., a connection) is initiated, the configuration manager 310 can generate a connection instance for the session. The connection instance can be populated with information indicative of the client, the machine and the message(s), and/or a connection ID (e.g., a keep-alive message), for example. Such information can be utilized to begin message transfer between the policy setting system and a client (e.g., mobile devices). Furthermore, the connection ID can be utilized to track message transmission within different machines.

The connection instance can additionally be dynamically updated to reflect transmission progress and provide transmission history. For example, indicia indicative of any portions—(including the entire message)—that have been transmitted successfully or failed can be associated with the connection instance. Transmission history can include information related to transfer commencement and completion, pauses and resumes, the level of communication activity (e.g., policy changes to be transferred) errors, re-submissions, and the like.

For example, when the policy setting system 300 is invoked to establish a policy setting on a mobile unit(s), the configuration manager 310 can track machine identity (e.g., a globally unique identity, or GUID), to generate a connection instance for such connection. The connection instance can include the identity for any of the machines that require configuration based on new policy settings, via the system parameters as part of the policy setting library 314. Such information can be utilized to locate the desired machine and verify that the desired machine have been provided with access or been properly configured with the new policy configurations.

This information can also be utilized to locate and verify the acknowledgments sent by the configured machines and associated configurations or policy settings. In addition, the connection ID and required configuration parameters can be included and employed as a key to the connection instance, and also by the configuration manager 310 to manage the transfer or policy setting session. It is to be appreciated that more than one machine on the client side can request connection to the policy setting system 300, as part of a plurality of distributed machines. In general, the connection ID stored within the connection instance can be utilized to determine which machine can access the connection instance and request policy settings from the policy setting system 300, during a synchronization process, for example.

Figure 4:
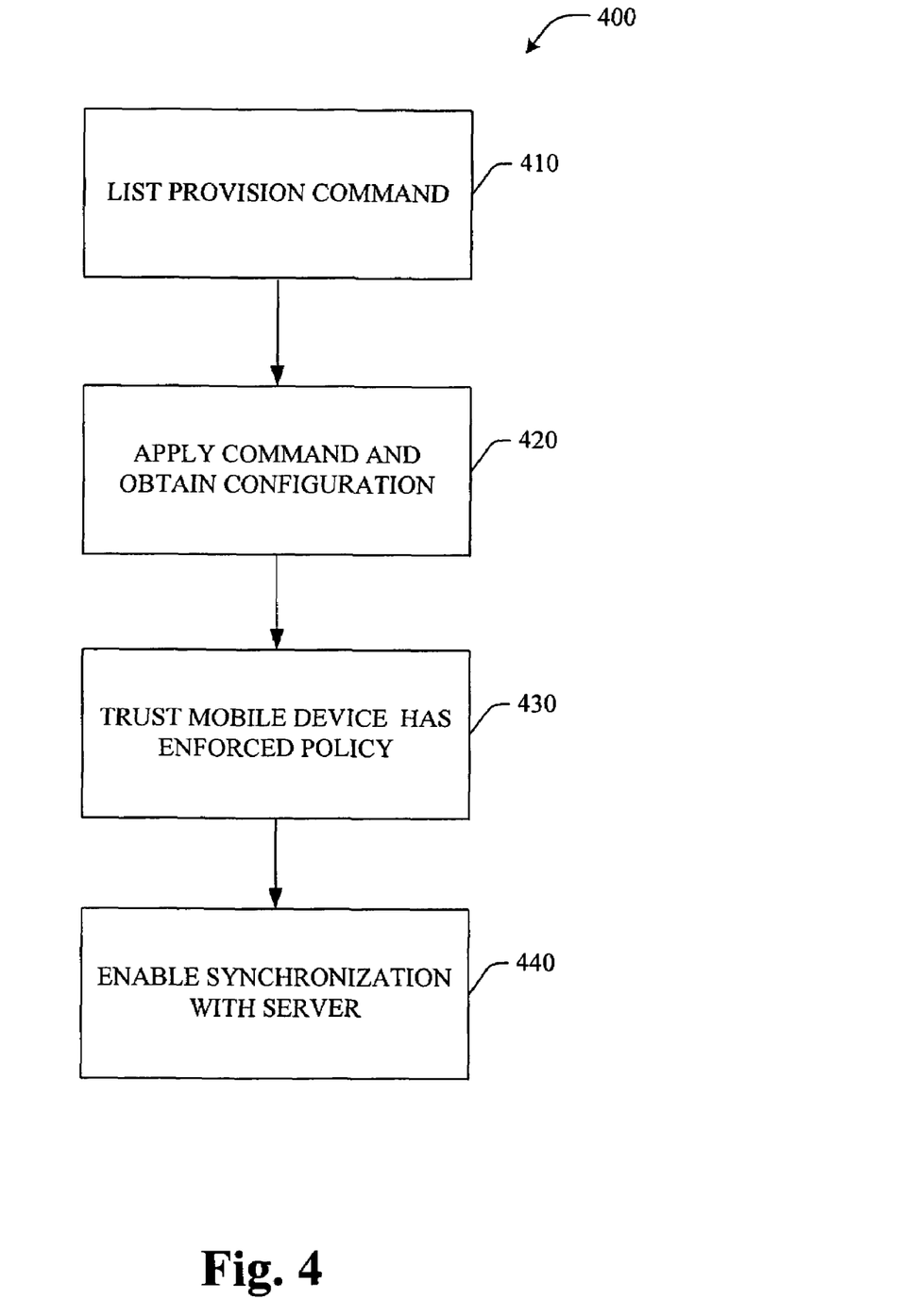
FIG. 4 illustrates an exemplary flowchart of a remote management that employs a Provision command in accordance with an aspect of the subject invention.

FIG. 4 illustrates a flowchart 400 of a methodology that employs a Provision command in accordance with an aspect of the subject invention. Typically such Provision command can facilitate negotiation of policy settings between a client requiring configuration and the server. Accordingly, the Provision command can enable the server to force a mobile device that requests a synchronization therewith, to comply with settings/policies designated by the server. As illustrated at 410 the policy settings can be managed by initially listing the Provision command (e.g., as part of an "options" command). Upon listing of the Provision command and at 420, the mobile device to be configured can execute the command and obtain a configuration, for example during an attempted synchronization. At 430, and upon positive confirmation from the device, the server will trust that the mobile device is locally enforcing the policies, and hence 440 a synchronization is permitted. In a related aspect the sever can track a shared key (identifying the policy) that is supplied to the server after a policy has been generated. If there is a mismatch between the client and the server, then the server will return a custom HTTP error (e.g., HTTP 512). When the client receives the custom HTTP error, such client can execute a Provision command to update the policy, obtaining the policy setting or a remote wipe directive as described in detail infra.

In general, the Provision command of the subject invention can be associated with a request/response pair such as: request and download of settings, and acknowledgement of receipt and application of settings. In addition, the mobile device to be configured typically requests updated policy settings without being explicitly instructed by the server in scenarios such as an initial synchronization and a synchronization after cold boot.

Figure 5:
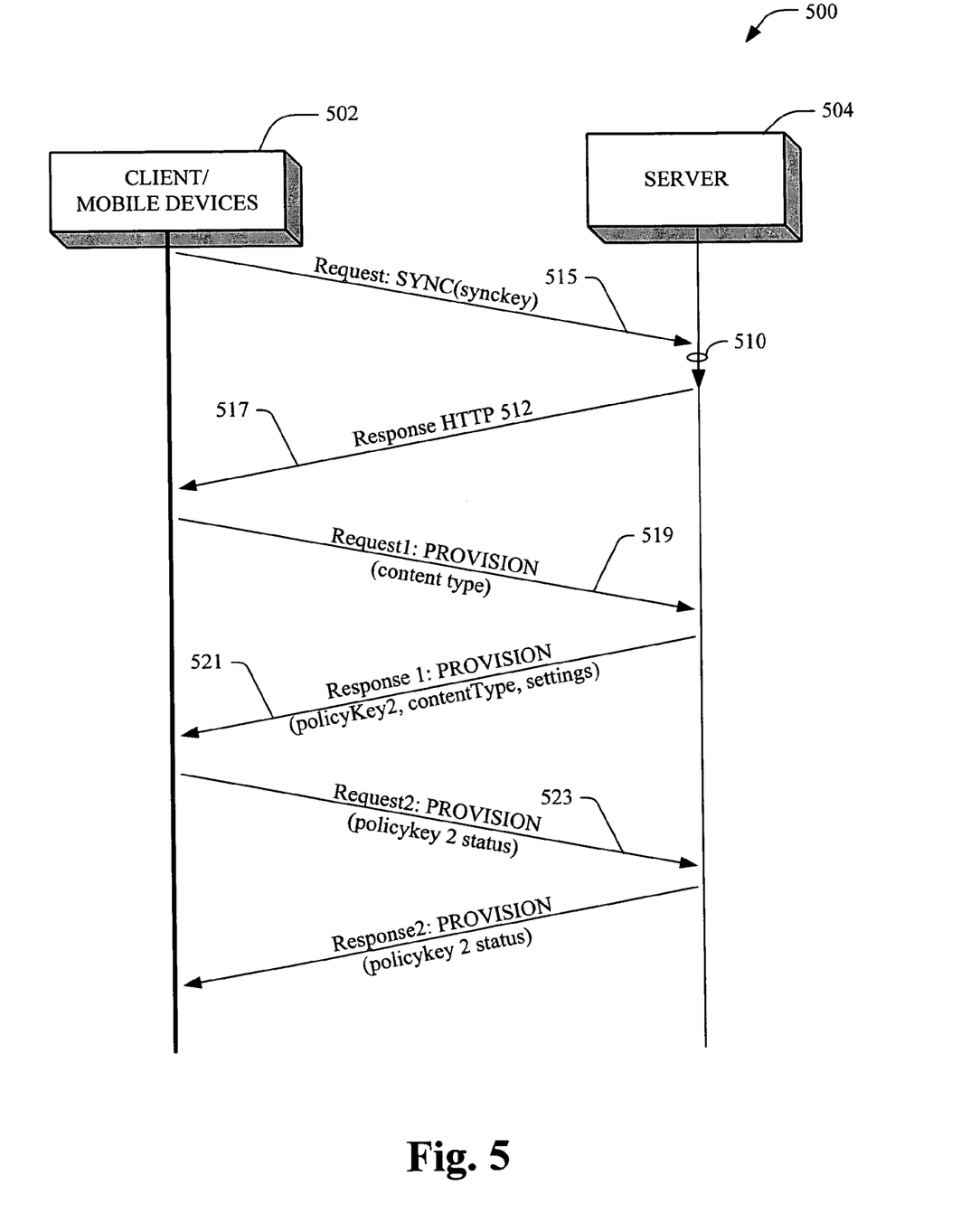
FIG. 5 illustrates a particular remote management interaction between the mobile device and the server for a policy configuration in accordance with an aspect of the subject invention.

Moreover, the server can force the device to issue the Provision command to update related policy settings at any time by issuing a HTTP 512 Error in response to a request from the mobile device. For example, FIG. 5 illustrates an interaction 500 between the client 502 and the server 504 in accordance with an aspect of the subject invention. Upon receiving a request 515 for a synchronization with the server 504, the server can determine that the policy on the client 502 is out of date at 510.

Accordingly, the server 504 identifies the policy key and upon detecting an invalid and/or expired policy, the server 504 returns an error message 517 to the client 502. Subsequently, and in response to such error message, the client returns a Provision command 519. Such Provision command 519 can specify a current version of the policy employed by the client 502 and a content type that it understands for the policy setting. The server 504 can then send down all settings (e.g., at once) at 521 to the client. Next, the client 502 can send an acknowledgement 523 that indicates that all policies required by the server 504 have been implemented, and at that point the server 504 can permit synchronization to occur.

Figure 6:
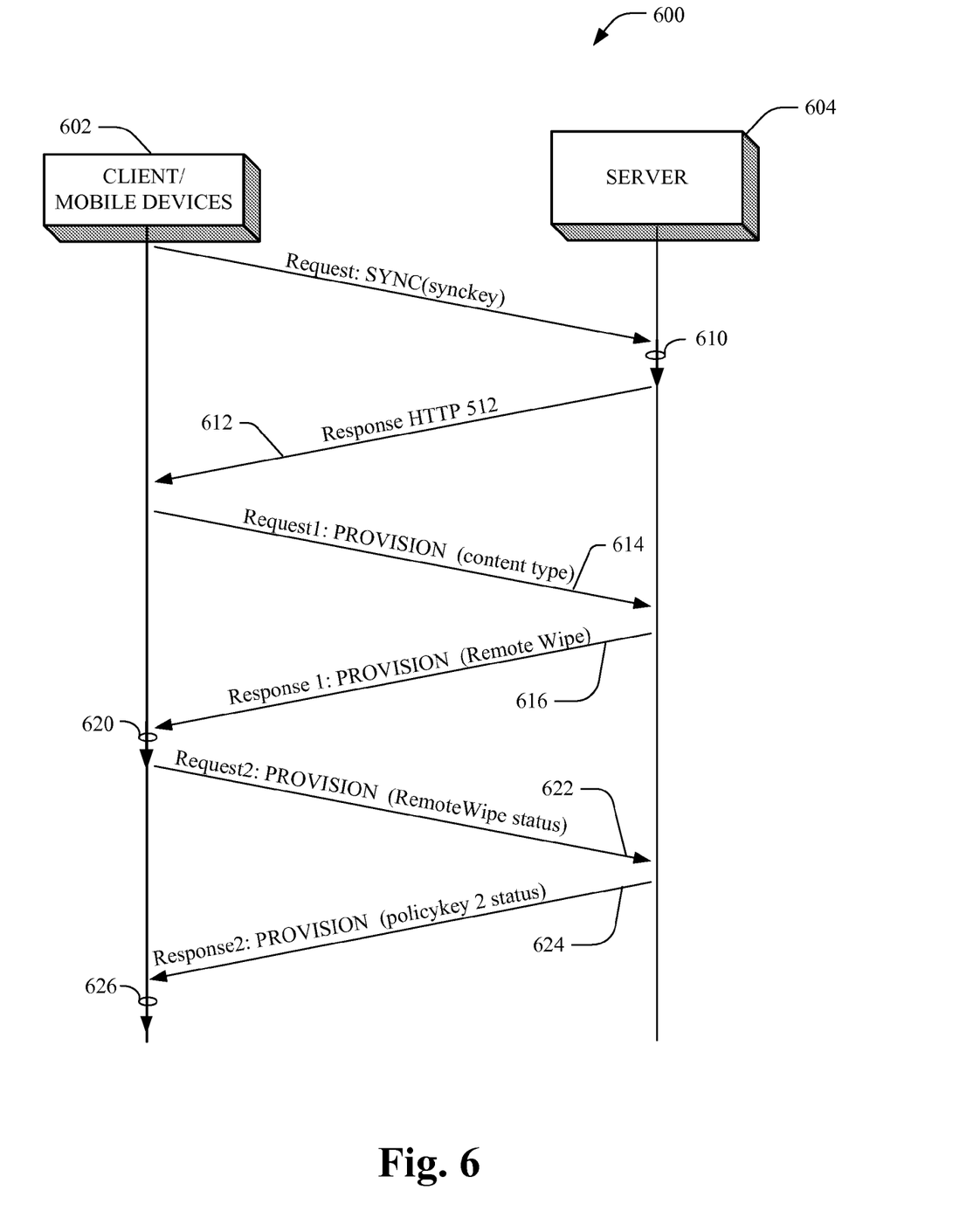
FIG. 6 illustrates a client—server interaction during a remote wipe command to delete data from the client.

Likewise and as illustrated in FIG. 6, a client-server interaction 600 is illustrated, wherein the server 604 can issue a remote wipe command to delete data from the mobile device 602 (e.g., when the device is lost or stolen). As such, upon the device 602 requesting a synchronization with the server 604, the server 604 can determine that an administrator has scheduled such device for a remote wipe at 610. Next, the server 604 can issue an HTTP 512 Error at 612 in response to a request from the mobile device 602. Subsequently, and in response to such error message, the client returns a Provision command at 614, which can specify a current version of the policy employed by the mobile device 602 and a content type that it understands for the policy setting. Upon receiving the Provision command 616 remote wipe, the mobile device 602 acknowledges receipt of the remote wipe command, without an execution thereof at 620. A pair of request and response can be interchanged at 622, 624 before the mobile device 602 executes a remote wipe command at 626.

Typically for settings associated with a download, the first phase of the Provision command can deal with requesting and downloading policy settings, and the request can be issued by the client or the server. The Provision request in general contains the PolicyType element, which specifies the format in which the policy settings are provided, and Descriptor element identifying the format in which the client wishes to receive the settings. An exemplary schema includes:

Request 1 XML Body Structure:

```
<Provision>
    <Policies>
        <Policy
            <PolicyType>
        </Policy>
    </Policies>
</Provision>
```

Likewise, a response as part of the Provision can be issued by the server in response to the request outlined above. The Provision response in general must contain a PolicyType element and a Descriptor that identifies the format in which the client wishes to receive the settings. In general, such should match the PolicyType requested by the client, and if the request cannot be honored, then an HTTP error code is returned.

Also, the PolicyKey element as referenced infra can indicate a key that corresponds to the current policy on the server, and can be employed by server/client to correlate requests & responses in the policy/remoteWipe session. For example, the policy key element can be employed by the server to mark the state of the policy settings on the device.

Moreover, the Provision response can contain different tags, depending on the context. For example, for a Policy Setting download response, an associated Data element can include: opaque structure containing policy settings for the device, wherein contents of opaque structure is being described by the PolicyType, with an optional matter that only needs to be sent if policy info needs to be conveyed. Similarly, a response for the RemoteWipe can include an element indicating that the recipient is to initiate the remote wipe sequence. An exemplary schema includes:

Response 1 XML Body Structure:

```
<Provision>
    <Policies>
        <Policy>
            <PolicyType>
            <PolicyKey>
            <Data>
        </Policy>
    </Policies>
    <RemoteWipe/>
</Provision>
```

Similarly, for settings associated with acknowledgement that pertain to the second phase of the Provision command, a request and a response can be provided. Upon receiving the policy settings or remoteWipe from the server via the Provision response in the settings download phase, the client typically should issue an acknowledgement that indicates a success or failure in receiving and intent to comply with the settings. Moreover, the Provision acknowledgement request can vary depending on the context.

For example, for case of acknowledging receipt of policy settings the PolicyType can include a Descriptor identifying the format in which the client wishes to receive the settings. The PolicyKey command can include Key corresponding to the current policy on the client. If such command is issued prior to an initial synchronization, and/or to reset the device's settings, a value of "0" can be employed for policyKey. In addition, a Status can indicate a success or failure, with a success being indicated if all settings are applied.

If acknowledging receipt of the remoteWipe directive, then the "RemoteWipe" element can indicate the remoteWipe session. Also a status can indicate a success or failure, and a success can be indicated if device processed command correctly and intends to execute a wipe of local contents.

An exemplary schema can include:

Request 2 XML Body Structure:

```
<Provision>
    <Policies>
        <Policy>
            <PolicyType>
            <PolicyKey>
            <Status>
        </Policy>
    </Policies>
    <RemoteWipe>
        <Status>
    </RemoteWipe>
</Provision>
```

Likewise, for a response upon receiving the acknowledgement request from the client, the server will update the device's state and indicate its success or failure in doing so, thereby completing the provisioning process. Also, the Provision acknowledgement request can vary depending on the context. For example, if acknowledging receipt of policy settings occurs, then the PolicyType can include a Descriptor identifying the format in which the client wishes to receive the settings. In addition, a PolicyKey can include a Key corresponding to the current policy on the client. If such command is issued prior to initial synchronization, and/or to reset the device's settings, a value of "0" for PolicyKey can be employed. A success can be indicated if all settings are applied. Likewise, for a RemoteWipe command, success is indicated only if device executes command directly and intends to execute a wipe of local contents.

An exemplary schema can include:

Request 2 XML Body Structure:

```
<Provision>
    <Policies>
        <Policy>
            <PolicyType>
            <PolicyKey>
            <Status>
            <Data>
        </Policy>
    </Policies>
    <RemoteWipe>
        <Status>
    </RemoteWipe>
</Provision>
```

Figure 7A:
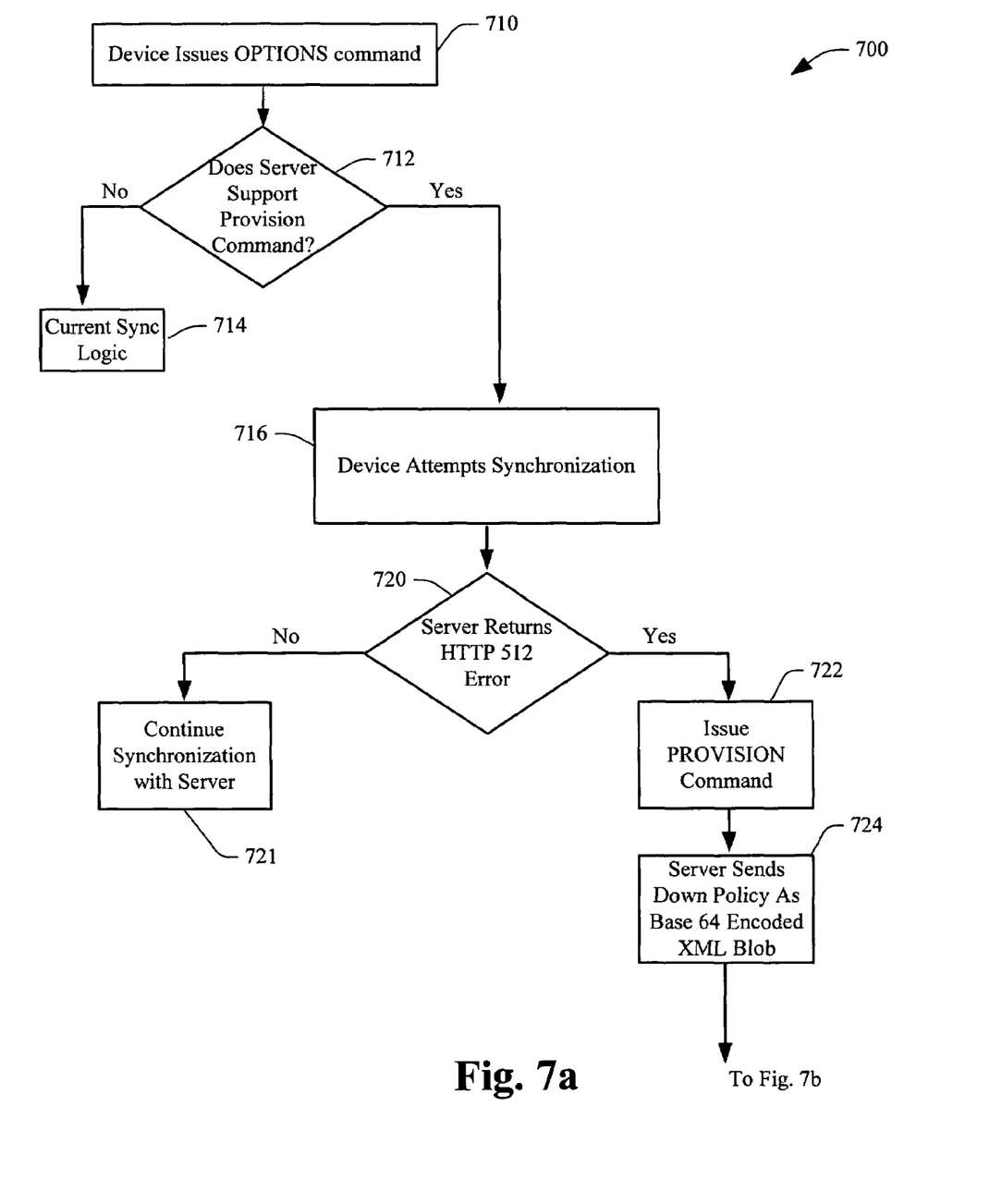
FIGS. 7a and 7b illustrate a flowchart for a provisioning design on a client in accordance with an aspect of the subject invention.
Figure 7B:
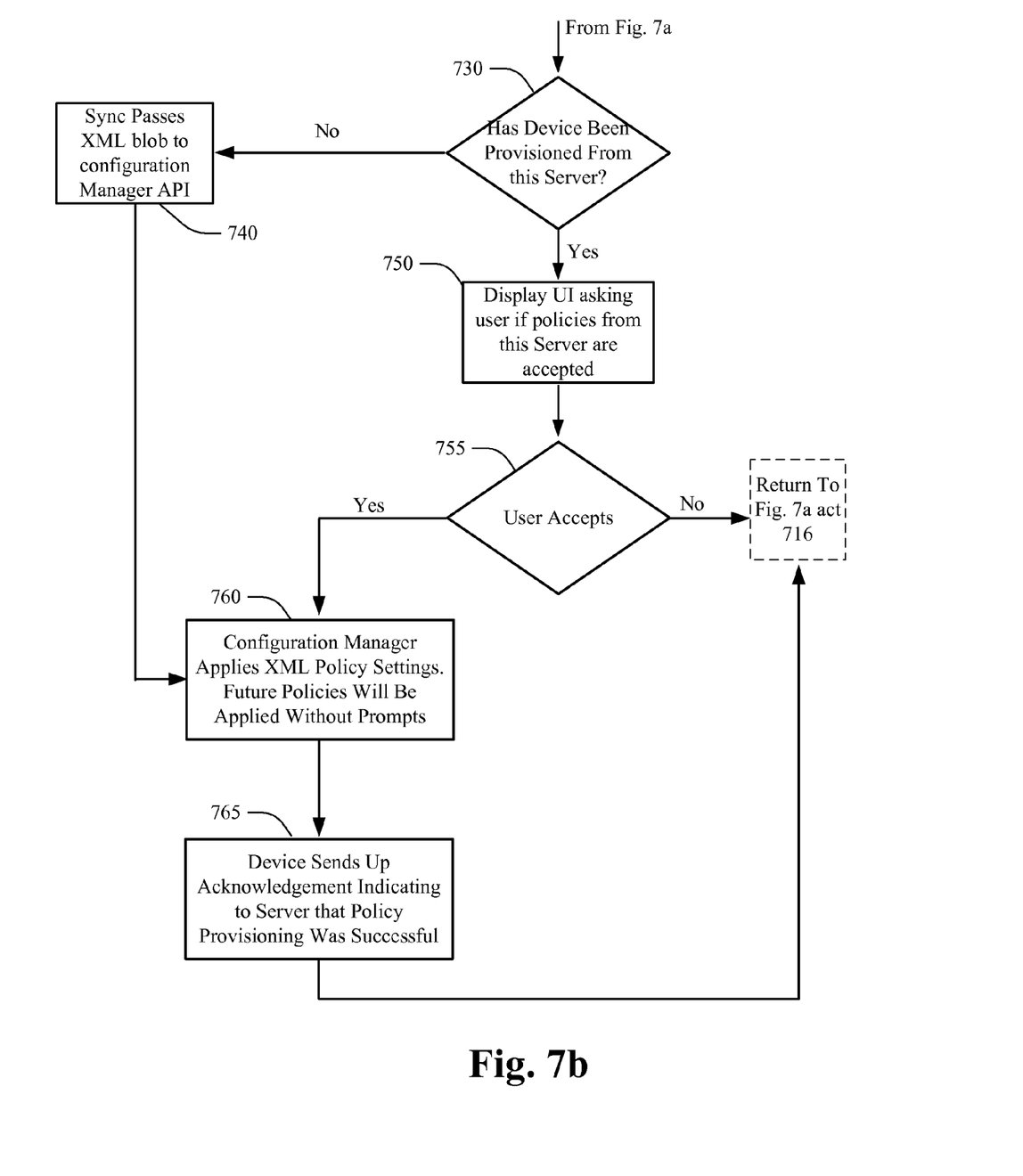

Referring now to FIGS. 7a and 7b, there is illustrated a flowchart for a methodology 700 for a provisioning design on a client in accordance with an aspect of the subject invention. While the exemplary method is illustrated and described herein as a series of blocks representative of various events and/or acts, the present invention is not limited by the illustrated ordering of such blocks. For instance, some acts or events may occur in different order and/or concurrently with other acts or events, apart from the ordering illustrated herein, in accordance with the invention. In addition, not all illustrated blocks, events or acts, may be required to implement a methodology in accordance with the present invention. Moreover, it will be appreciated that the exemplary method and other methods according to the invention may be implemented in association with the method illustrated and described herein, as well as in association with other systems and apparatus not illustrated or described.

The methodology initiates at 710 wherein a mobile device connecting for the first time to the server issues an Options command. A response to the Options command will list Provision command as a supported command for the data synchronization protocol. At 712 a determination is made as to whether the server supports the Provision command. If not, a current synchronization logic can be employed between the server and the device, at 714. Otherwise, an attempt for synchronization between the device and the server occurs at 716. A determination can then be made whether device has the latest policy (e.g., whether server returns HTTP 512 at 720.) If no such error is returned, synchronization can continue with the server at 721. Otherwise, a Provision command issues at 722, wherein the server can send down a base 64 encoded XML collection of binary data (e.g., Binary Large Object—blob) that contains security policy at 724. Such blob can remain opaque to the data synchronization protocol layer, and is not parsed. A first time that a policy is provisioned from the server, (e.g., a determination can be made at 730 to verify whether device has been previously provisioned from the server and if not, the XML blob can be passed to the configuration manager API at 740), the configuration manager can pop up a dialog box that asks the user whether the policies from the server is accepted at 750, and 755. If not, the methodology returns to act 716 of FIG. 7a. Otherwise, a configuration manager can apply the XML policy settings at 760, followed by sending acknowledgement at 765 that indicates to the server that policy provisioning has been successful, and a return to act 716 of FIG. 7a. The following represents an exemplary schema in accordance with an aspect of the subject invention:

```
<wap-provisioningdoc>
    <characteristic type="Sync">
        <characteristic type="Connection">
            <parm name="User" value="massici"/>
            <parm name="Password" value=" "/>
            <parm name="Server"
            value="exchange.microsoft.com"/>
            <parm name="Domain" value="REDMOND"/>
        </characteristic>
        <characteristic type="Mail">
            <parm name="Enabled" value="1"/>
            <parm name="SyncSwitchPurge" value="3"/>
        </characteristic>
        <characteristic type="Contacts">
            <parm name="Enabled" value="1"/>
            <parm name="SyncSwitchPurge" value="3"/>
        </characteristic>
        <characteristic type="Calendar">
            <parm name="Enabled" value="1"/>
            <parm name="SyncSwitchPurge" value="3"/>
        </characteristic>
        <characteristic type="Settings">
            <parm name="SyncAfterTimeWhenCradled"
            value="5"/>
            <parm name="PeakStartTime" value="0800"/>
            <parm name="PeakEndTime" value="1800"/>
            <parm name="PeakFrequency" value="0"/>
            <parm name="OffPeakFrequency" value="0"/>
            <parm name="SyncWhenRoaming" value="0"/>
            <parm name="SendMailItemsImmediately"
            value="0"/>
            <parm name="DeviceSMSAddress" value=" "/>
            <parm name="DeviceAddressingMethod"
            value="1"/>
            <characteristic type="PeakDays">
            <parm name="Sun" value="0"/>
            <parm name="Mon" value="1"/>
            <parm name="Tue" value="1"/>
            <parm name="Wed" value="1"/>
            <parm name="Thr" value="1"/>
            <parm name="Fri" value="1"/>
            <parm name="Sat" value="0"/>
            </characteristic>
        </characteristic>
    </characteristic>
</wap-provisioningdoc>
```

Figure 8:
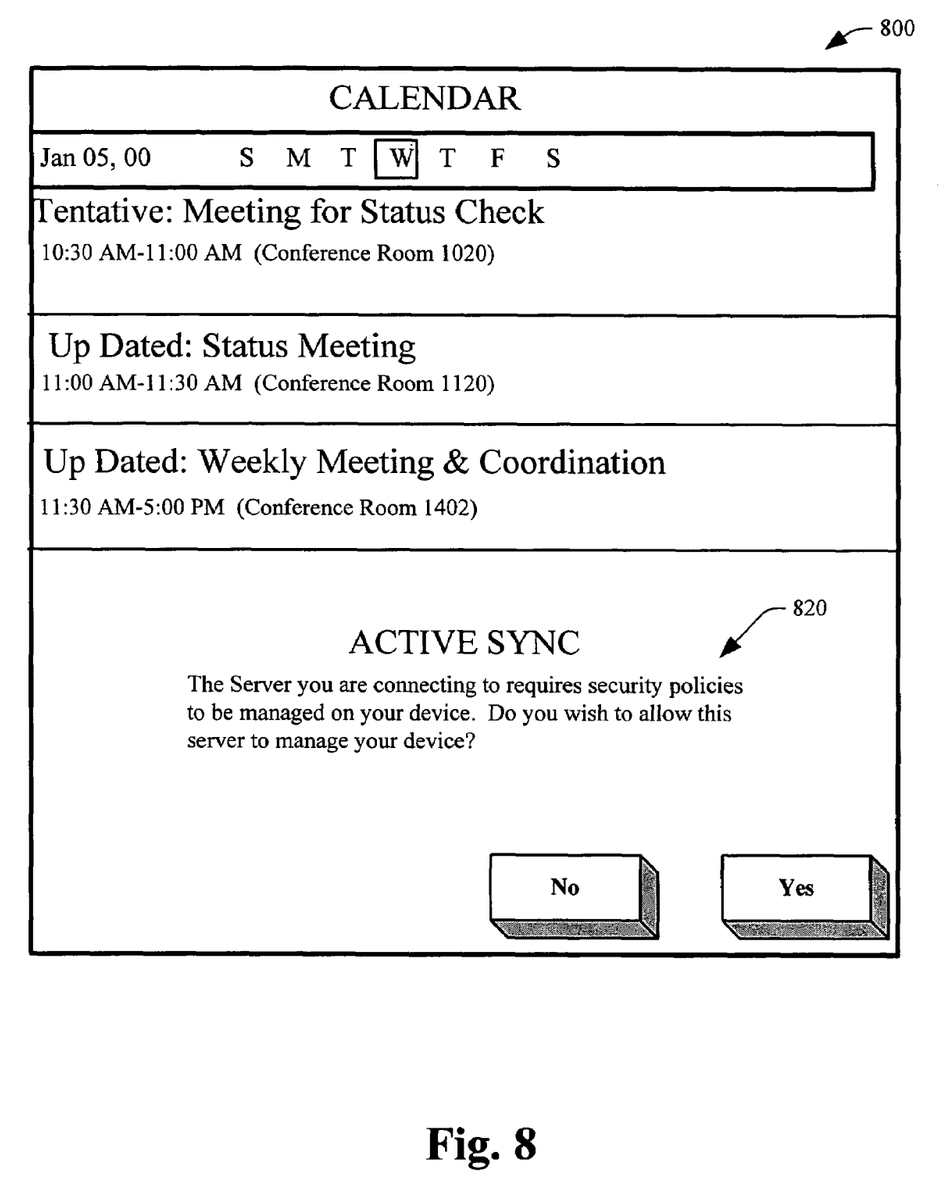
FIG. 8 illustrates an exemplary graphical uniform interface employed for presentation of Provision command offered by the server to a mobile client.

FIG. 8 illustrates an exemplary graphical uniform interface employed for presentation of the Provision command offered by the server to a mobile client, wherein the user can then select management of security policies to be performed on the mobile device. Such graphical use interface can be supplied as part of a management and organization for a variety of PIM (personal information manager) data.

The graphical interface 800 displays a dialog box, and can provide a user with a choice for selection of policy management by the server during a synchronization therewith. The exemplary user interface (UI) 800 of the subject invention can be employed to facilitate account generation for synchronization purposes. Such UI 800 comprises a selection region 820 for selecting a choice to set policies offered by a server. In addition, a space (not shown) can be reserved on the UI 800 to display a logo associated with the server that request proactive policy settings on the mobile device, with a description section that can describe the nature of the policy settings. The user can then select whether such proactive policy setting is desired.

Figure 9:
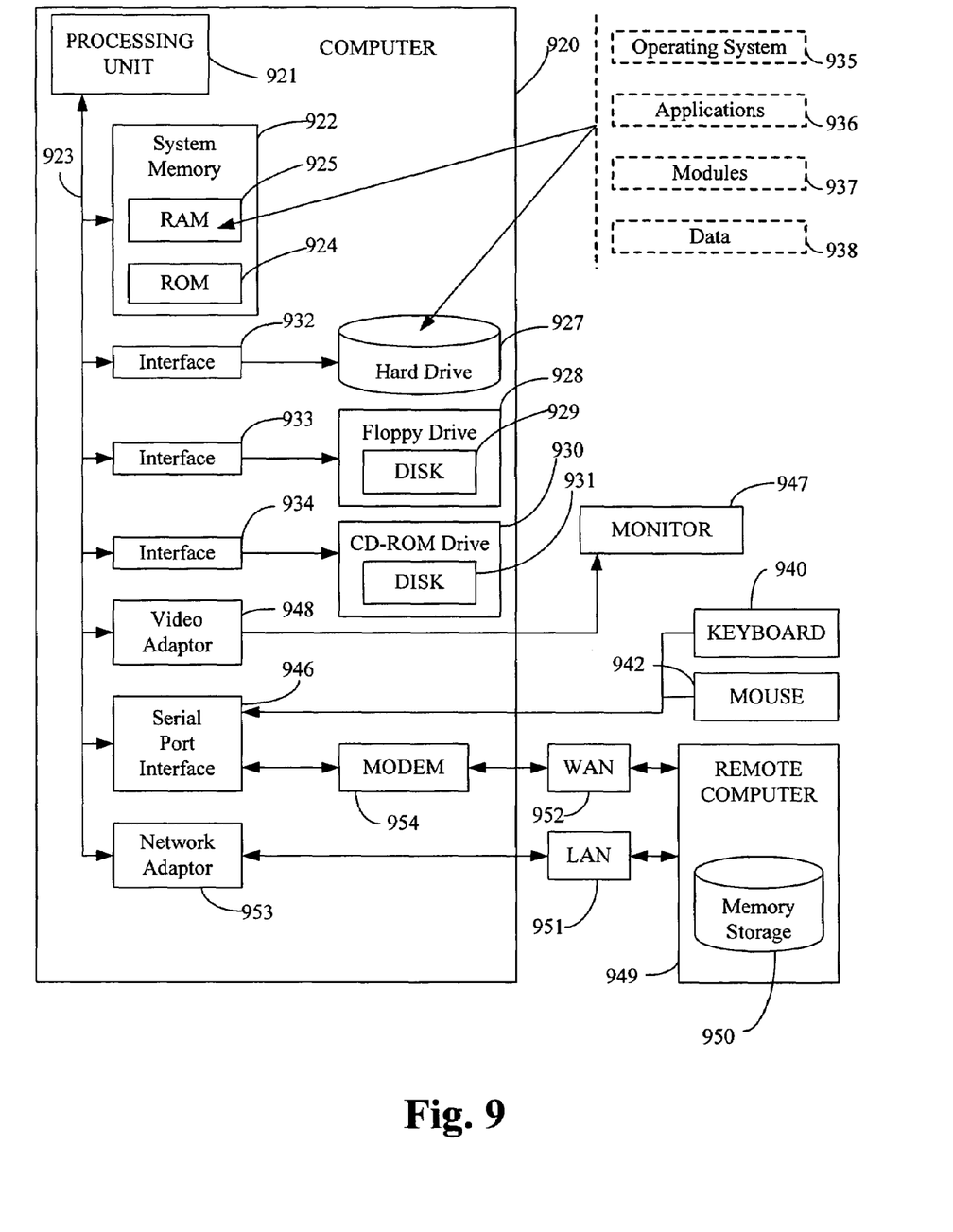
FIG. 9 illustrates a brief, general description of a suitable computing environment wherein the various aspects of the subject invention can be implemented.

Referring now to FIG. 9, a brief, general description of a suitable computing environment is illustrated wherein the various aspects of the subject invention can be implemented. While the invention has been described above in the general context of computer-executable instructions of a computer program that runs on a computer and/or computers, those skilled in the art will recognize that the invention can also be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like. As explained earlier, the illustrated aspects of the invention can also be practiced in distributed computing environments where tasks are performed by remote processing devices that are linked through a communications network. However, some, if not all aspects of the invention can be practiced on stand-alone computers. In a distributed computing environment, program modules can be located in both local and remote memory storage devices. The exemplary environment includes a computer 920, including a processing unit 921, a system memory 922, and a system bus 923 that couples various system components including the system memory to the processing unit 921. The processing unit 921 can be any of various commercially available processors. Dual microprocessors and other multi-processor architectures also can be used as the processing unit 921.

The system bus can be any of several types of bus structure including a USB, 1394, a peripheral bus, and a local bus using any of a variety of commercially available bus architectures. The system memory may include read only memory (ROM) 924 and random access memory (RAM) 925. A basic input/output system (BIOS), containing the basic routines that help to transfer information between elements within the computer 920, such as during start-up, is stored in ROM 924.

The computer 920 further includes a hard disk drive 927, a magnetic disk drive 928, e.g., to read from or write to a removable disk 929, and an optical disk drive 930, e.g., for reading from or writing to a CD-ROM disk 931 or to read from or write to other optical media. The hard disk drive 927, magnetic disk drive 928, and optical disk drive 930 are connected to the system bus 923 by a hard disk drive interface 932, a magnetic disk drive interface 933, and an optical drive interface 934, respectively. The drives and their associated computer-readable media provide nonvolatile storage of data, data structures, computer-executable instructions, etc. for the computer 920. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment, and further that any such media may contain computer-executable instructions for performing the methods of the subject invention.

A number of program modules can be stored in the drives and RAM 925, including an operating system 935, one or more application programs 936, other program modules 937, and program data 938. The operating system 935 in the illustrated computer can be substantially any commercially available operating system.

A user can enter commands and information into the computer 920 through a keyboard 940 and a pointing device, such as a mouse 942. Other input devices (not shown) can include a microphone, a joystick, a game pad, a satellite dish, a scanner, or the like. These and other input devices are often connected to the processing unit 921 through a serial port interface 946 that is coupled to the system bus, but may be connected by other interfaces, such as a parallel port, a game port or a universal serial bus (USB). A monitor 947 or other type of display device is also connected to the system bus 923 via an interface, such as a video adapter 948. In addition to the monitor, computers typically include other peripheral output devices (not shown), such as speakers and printers.

The computer 920 can operate in a networked environment using logical connections to one or more remote computers, such as a remote computer 949. The remote computer 949 may be a workstation, a server computer, a router, a peer device or other common network node, and typically includes many or all of the elements described relative to the computer 920, although only a memory storage device 950 is illustrated in FIG. 9. The logical connections depicted in FIG. 9 may include a local area network (LAN) 951 and a wide area network (WAN) 952. Such networking environments are commonplace in offices, enterprise-wide computer networks, Intranets and the Internet.

When employed in a LAN networking environment, the computer 920 can be connected to the local network 951 through a network interface or adapter 953. When utilized in a WAN networking environment, the computer 920 generally can include a modem 954, and/or is connected to a communications server on the LAN, and/or has other means for establishing communications over the wide area network 952, such as the Internet. The modem 954, which can be internal or external, can be connected to the system bus 923 via the serial port interface 946. In a networked environment, program modules depicted relative to the computer 920, or portions thereof, can be stored in the remote memory storage device. It will be appreciated that the network connections shown are exemplary and other means of establishing a communications link between the computers can be employed.

In accordance with the practices of persons skilled in the art of computer programming, the subject invention has been described with reference to acts and symbolic representations of operations that are performed by a computer, such as the computer 920, unless otherwise indicated. Such acts and operations are sometimes referred to as being computer-executed. It will be appreciated that the acts and symbolically represented operations include the manipulation by the processing unit 921 of electrical signals representing data bits which causes a resulting transformation or reduction of the electrical signal representation, and the maintenance of data bits at memory locations in the memory system (including the system memory 922, hard drive 927, floppy disks 929, and CD-ROM 931) to thereby reconfigure or otherwise alter the computer system's operation, as well as other processing of signals. The memory locations wherein such data bits are maintained are physical locations that have particular electrical, magnetic, or optical properties corresponding to the data bits.

Figure 10:
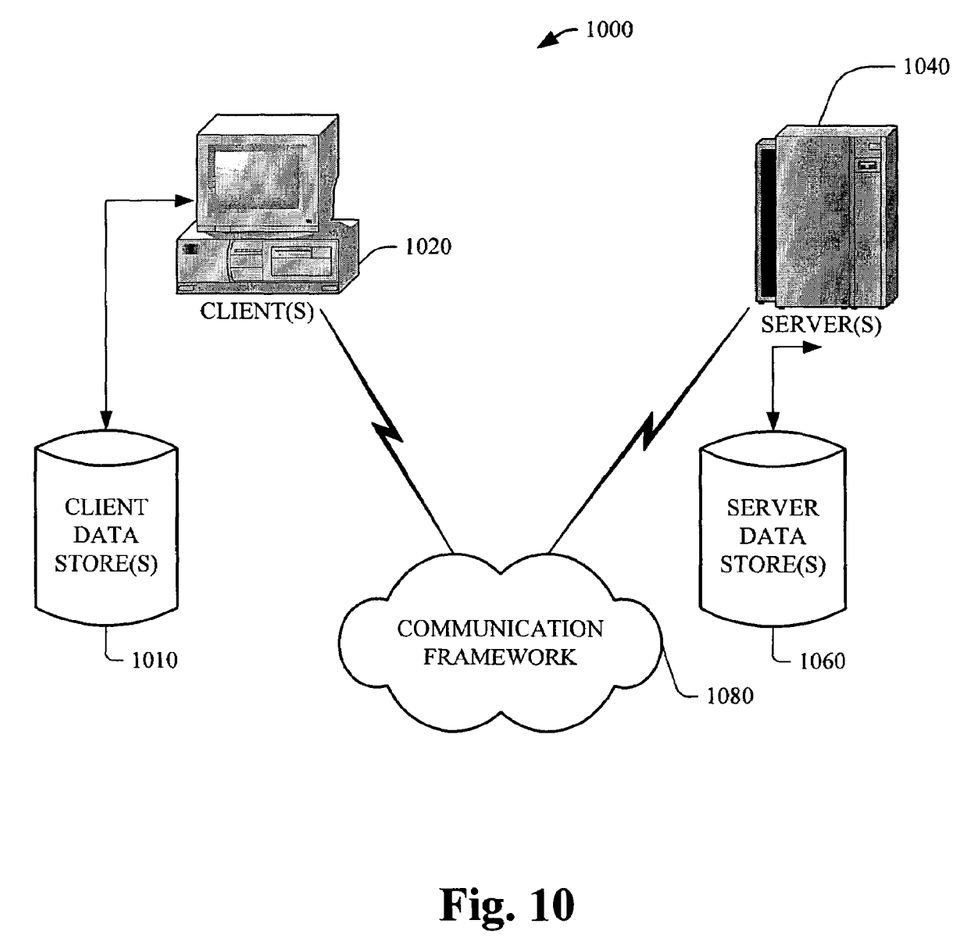
FIG. 10 illustrates a client—server system that can employ a proactive policy setting according to one aspect of the invention.

Referring now to FIG. 10, a client-server system 1000 that can employ a proactive policy setting according to one aspect of the invention is illustrated. The client(s) 1020 can be hardware and/or software (e.g., threads, processes, computing devices). The system 1000 also includes one or more server(s)

1040. The server(s) 1040 can also be hardware and/or software (e.g., threads, processes, computing devices). For example, such servers 1040 can house threads to perform transformations by employing the invention. The client 1020 and the server 1040 can communicate, between two or more computer processes. As illustrated, the system 1000 includes a communication framework 1080 that can facilitate communications between the client(s) 1020 and the server(s) 1040. The client(s) 1020 is operationally connected to one or more client data store(s) 1010 that can store information local to the client(s) 1020. Moreover, client 1020 can access and update databases 1060 located on a server computer 1040 running a server process. In one aspect of the invention, the communication frame work 1080 can be the internet, with the client process being a Web browser and the server process being a Web server. As such, a typical client 1020 can be a general purpose computer, such as a conventional personal computer having a central processing unit (CPU), system memory a modem or network card for connecting the personal computer to the Internet, and a display as well as other components such as a keyboard, mouse, and the like. Likewise a typical server 1040 can be university or corporate mainframe computers, or dedicated workstations, and the like.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention. Furthermore, to the extent that the terms "includes", "including", "has", "having", and variants thereof are used in either the detailed description or the claims, these terms are intended to be inclusive in a manner similar to the term "comprising.

What is claimed is:

1. A method of synchronization between a mobile device and a server, comprising:
   issuing a synchronization command from the mobile device to the server, the synchronization command including at least a first policy key identifying the current policy in use by the mobile device and a content type identifying a format for policy settings understandable by the mobile device;
   identifying the current policy on the mobile device;
   detecting at the server that the current policy in use by the mobile device is invalid by the server;
   determining whether the mobile device has previously been provisioned by the server, and upon determining that the mobile device has not been provisioned displaying a dialog box to a user of the mobile device to allow the user to opt out of synchronization of the mobile device with the server;
   issuing a first response by the server formatted in accordance with the content type that identifies at least one of a second policy key and content type to the mobile device in response to the synchronization request by the mobile device, the second policy key identifying a new policy to be used by the mobile device;
   proactively setting the new policy on the mobile device by the server prior to permitting a synchronization of the mobile device with the server, and
   verifying enforcement of the new policy on the mobile device by the server.

2. The method of claim 1, further comprising integrating policy settings and configuration at the server to enable employing a single communication channel during interaction with the mobile device.

3. The method of claim 1, further comprising denying synchronization services to a mobile device having a non-compliant policy.

4. The method of claim 1, further comprising issuing an error message by the server upon identification of a mobile device having a non-compliant policy.

5. The method of claim 1, further comprising forcing at least one of a PIN lock arrangement or a PIN lock minimum length on the mobile device.

6. The method of claim 1, further comprising forcing a local wipe on the mobile device.

7. The method of claim 1, further comprising imposing arbitrary policies on the mobile device.

8. The method of claim 1, further comprising issuing a provisioning command to negotiate policy settings between the mobile device and the server.

9. The method of claim 1, further comprising receiving a second request at the server from the mobile device that identifies policy key and status.

10. The method of claim 1, further comprising trusting the mobile device by the server for initiating of synchronization upon receiving confirmation from the mobile device that the new policy has been applied.

11. The method of claim 1, further comprising downloading settings to the client in response to a request from the client.

12. The method of claim 11, further comprising receiving acknowledgement and receipt of settings by the server from the mobile device.

13. The method of claim 12, further comprising receiving request at the server from the mobile device for updated policy settings.

14. A system of setting policies from a server to a mobile device comprising:
    a configuration manager that proactively sets server policies on the mobile device in response to a synchronization request from the mobile device, the synchronization request including at least a first policy key identifying a policy currently in use by the mobile device and a content type identifying a format in which the mobile device prefers to receive policy settings, the configuration manager sending a response to the mobile device that includes at least a second policy key identifying a new server policy to be used by the mobile device, the response formatted in accordance with the content type; and
    a setting library that facilitates a track authorization, security, and validation of the mobile device that requests connection to the server.

15. The system of claim 14, a connection instance generated by the configuration manager and dynamically updated to reflect transmission progress between the server and the mobile device.

16. The system of claim 15, the connection instance includes identity of the mobile device that requires configuration by the server.

17. The system of claim 16, the connection instance facilitates verification for installations of policy configurations on the mobile device.

18. A system of setting policies from a server to a mobile device comprising;
   means for receiving a synchronization request from the mobile device at the server, the synchronization request including at least a first policy key identifying a current policy in use by the mobile device and a content type indicating a preferred format for policy settings;
   means for proactively setting a new policy on the mobile device via a response signal from the server prior to permitting a synchronization of the mobile device with the server, the response signal formatted in accordance with the content type and including at least a second policy key indicating the new policy, and
   means for verifying enforcement of the new policy on the mobile device by the server, and
   means for determining whether the mobile device has previously been provisioned by the server, and upon determining that the mobile device has not been provisioned displaying a dialog box to a user of the mobile device to allow the user to opt out of synchronization of the mobile device with the server.

19. The system of claim 18, further comprising means for forcing a local wipe on the mobile device.

20. The system of claim 18, further comprising means for denying synchronization services to a mobile device having a non-compliant policy.

* * * * *